United States Patent
Smith, Jr. et al.

(10) Patent No.: US 6,603,839 B1
(45) Date of Patent: Aug. 5, 2003

(54) AUTOMATIC TRANSFER OF ELECTRONIC DIRECTORY ENTRIES FROM DIRECTORY ASSISTANCE SERVICE TO A DIRECTORY WITHIN AN ELECTRONIC COMMUNICATION DEVICE

(75) Inventors: Newton James Smith, Jr., Austin, TX (US); Clifford Jay Spinac, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 09/661,455

(22) Filed: Sep. 13, 2000

(51) Int. Cl.⁷ .............................................. H04M 11/00
(52) U.S. Cl. ................ 379/93.23; 379/355.02
(58) Field of Search ................ 379/93.23, 100.14, 379/218.01, 218.02, 216.01, 355.01, 355.02, 355.03, 355.05, 355.06, 355.07; 455/564, 563

(56) References Cited

U.S. PATENT DOCUMENTS

| | | | |
|---|---|---|---|
| 5,528,680 A | 6/1996 | Karpicke | |
| 5,675,324 A | 10/1997 | Hashimoto et al. | |
| 5,689,547 A | 11/1997 | Mölne | |
| 5,689,700 A | 11/1997 | Miller et al. | |
| 5,727,046 A | 3/1998 | Almulla | |
| 5,802,149 A | 9/1998 | Hanson | |
| 5,838,783 A | 11/1998 | Cheng et al. | |
| 5,903,632 A | 5/1999 | Brandon | |
| 5,948,071 A | 9/1999 | Bouanaka et al. | |
| 5,995,826 A | 11/1999 | Cox et al. | |
| 6,005,927 A | 12/1999 | Rahrer et al. | |
| 6,212,408 B1 | * 4/2001 | Son et al. | 455/563 |
| 6,295,355 B1 | * 9/2001 | O'Neal et al. | 379/356 |
| 6,321,098 B1 | * 11/2001 | Beith et al. | 379/355.01 |

* cited by examiner

Primary Examiner—Stella Woo
(74) Attorney, Agent, or Firm—Kevin L. Daffer; Conley Rose P.C.; David Mims, IBM

(57) ABSTRACT

A system and method are presented for receiving directory information from directory assistance to an electronic communication device. Electronic communication devices may include, but are not limited to telephones, facsimile machines and electronic organizers. The system and method as described herein allows a user of an electronic communication device to contact directory assistance to obtain directory information and subsequently have the information transmitted to the directory of the device. Thus, the information is electronically transferred to the device without intervention from the user. The transfer may include an update of an existing directory entry within the electronic communication device or the creation of a new entry. The system and method as described herein minimizes the tedious and laborious task of creating and updating directory entries for the user.

23 Claims, 12 Drawing Sheets

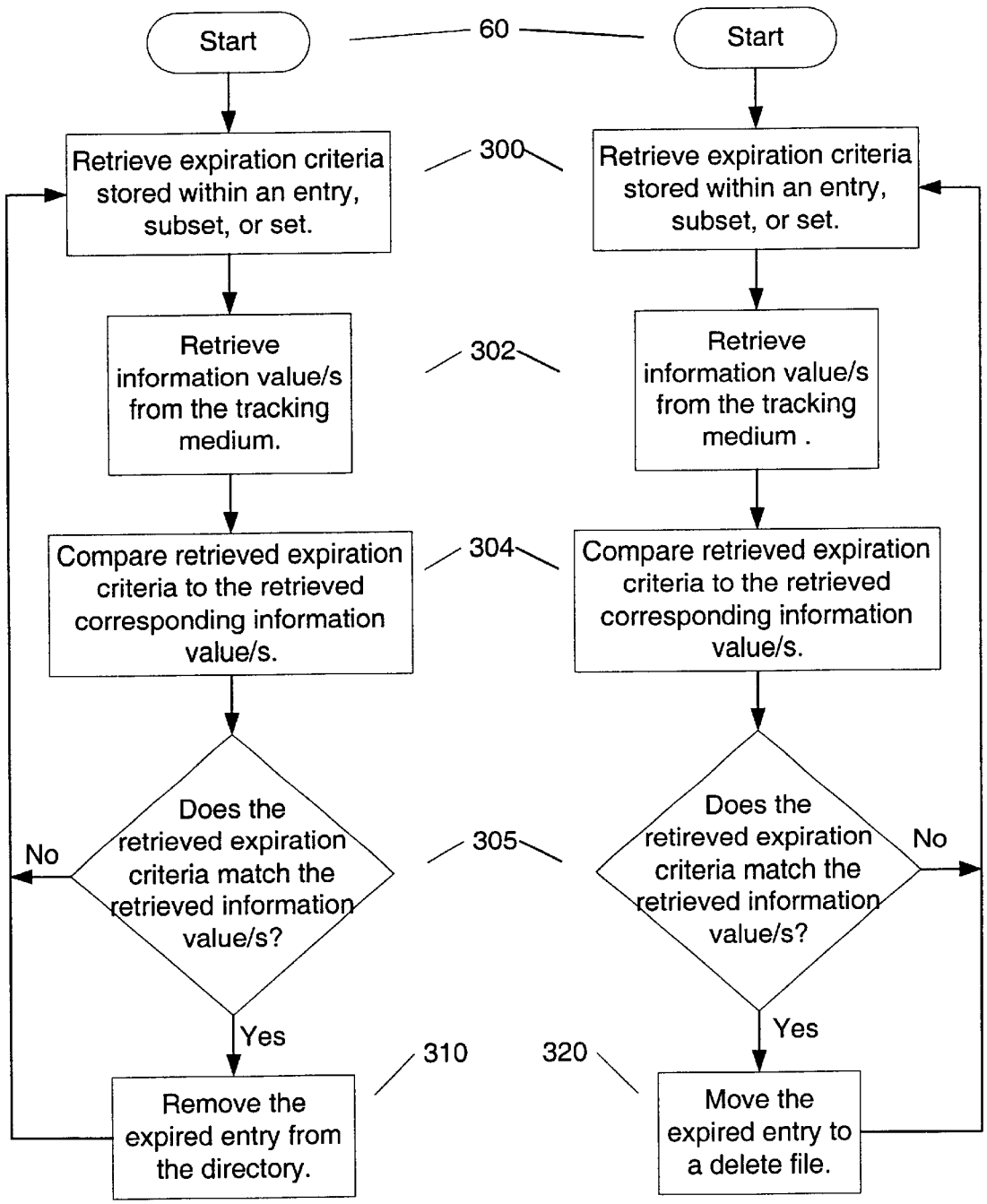

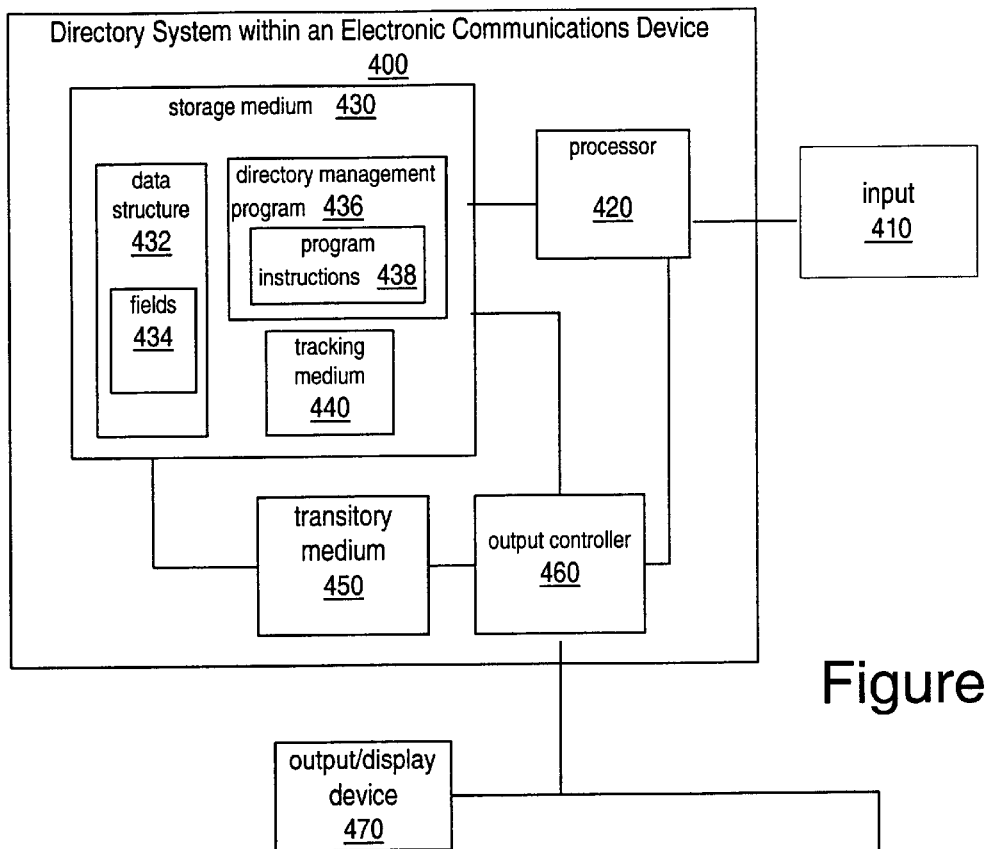
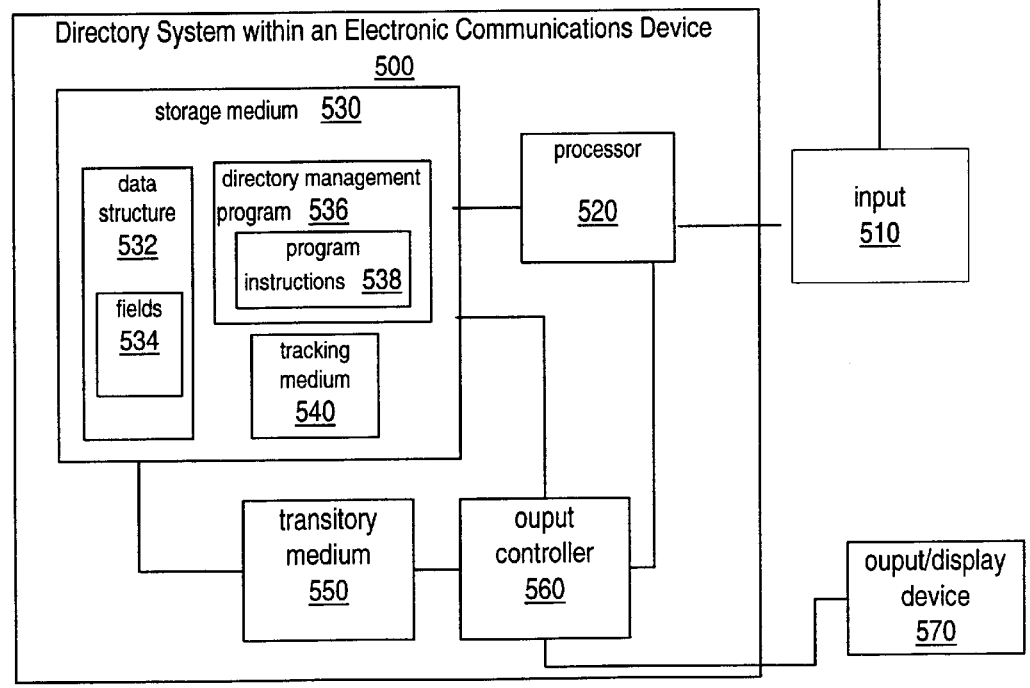
Figure 13

AUTOMATIC TRANSFER OF ELECTRONIC DIRECTORY ENTRIES FROM DIRECTORY ASSISTANCE SERVICE TO A DIRECTORY WITHIN AN ELECTRONIC COMMUNICATION DEVICE

RELATED APPLICATIONS

This application is related to the following copending U.S. Patent Applications, filed on even date herewith: Ser. No. 09/660,958 entitled "Hierarchical Organization of Directory Entries within Electronic Communication Devices" by Smith, Jr. et al., Ser. No. 09/660,957 entitled "Establishment of Expiration Criteria within Directories of Electronic Communication Devices" by Smith, Jr. et al., Ser. No. 09/661,454 entitled "Method and System for Transferring and Receiving Directory Information to and from Electronic Communication Devices" by Smith, Jr. et al., Ser. No. 09/662,431 entitled "Automatic Update of a Directory Entry within a Directory of an Electronic Communication Device by Electronic Notification" by Smith, Jr. et al., and Ser. No. 09/660,982 entitled "Method and System for Updating Directory Entries within Electronic Communication Devices by Accessing an Electronic Database" by Smith, Jr. et al.

BACKGROUND OF THE INVENTION

1. Field of the Invention

This invention relates to the transfer of information, and more particularly to the update of directory information from a directory assistance service to an electronic communication device.

2. Description of the Related Art

The following descriptions and examples are not admitted to be prior art by virtue of their inclusion within this section.

Recently, telephone directories have become a common feature within telephones and other electronic devices due to the increasing demand for and use of electronic organizational tools. The feature often includes the ability to program and store a plurality of telephone numbers along with corresponding descriptors. Additional information such as mailing addresses, e-mail addresses, or other user-defined information may also be programmed into the directory depending on the storage capacity of the device. The directories serve to store information in an electronic format so that the user may retrieve it quickly. In several telephone apparatuses, a telephone number may be retrieved from the directory and the user may be subsequently connected to the corresponding destination, so that the number does not have to be manually dialed.

As indicated above, telephone directories may be included in a variety of devices to utilize the benefit of organizing telephone numbers, addresses and other pertinent information. Many telephones, including both landline and wireless, contain directories with programmable and storage capabilities. These devices offer the advantage of having a directory and telephone as one unit. Furthermore, directories within mobile telephones present an additional advantage of mobility. Other devices which may store directories include, for example, personal digital assistants (PDA's) and facsimile (FAX) machines.

However, there are limitations associated with the use of current directory systems. For example, currently available systems may allow individual entries to be added, deleted or edited, but such systems may not allow efficient updating of a directory when multiple entries are involved. As communications devices such as telephones, FAX machines and PDA's become more and more powerful, and their use becomes increasingly widespread, multiple situations may arise in which such updating is required. For example, a telephone user changing his place of employment may need to rapidly update his telephone's directory to reflect the change in co-workers. In another example, an employee may obtain a different position within the same organization, and wish to efficiently transfer directory entries related to a particular project to her replacement on that project. Furthermore, a traveler may need to efficiently remove directory entries related to a geographic location that the traveler is leaving.

Management of the above situations may be difficult using current directory systems for several reasons. First of all, most applications require the user to manage the directory manually (i.e. adding, editing and deleting entries), which is tedious, laborious, and error-prone. The manual process can either entail punching a keypad, writing the information on a touch-activated pad, reciting the information in a voice-activated system or any other data-entering process. Furthermore, entry modifications are not typically brought to the user's attention until the user attempts to employ the old information, making an up-to-date directory difficult to maintain. For example, when individuals move or change their telephone number, often the user of the device is not notified until the old number is called. The delay in obtaining accurate information lessens the advantage and effectiveness of possessing and accessing a personal directory. Alternatively, the user may opt to review each entry with a secondary source on a frequent basis in order to keep the directory current. However, this method of entry review is rather time-consuming and often deemed futile since the secondary source may not possess the latest information. Furthermore, entries within current directories must generally be deleted or edited individually, requiring large amounts of time by the user. For example, if the user has several directory entries for one company and the company moves to a new location, the address field for each entry associated with the company must be updated individually. In some applications, a modification may require the manual reentry of all of the information within the entry, thus occupying even more of the user's time.

Often directory information is obtained from database resources, such as directory assistance, computer networks, or internet listings. However, the obtained information must often still be entered into the user's personal directory manually. For example, when an employee changes departments within a company, the directory information for the employee's new co-workers may be obtained from the company's computer network. However, the employee will still need to enter the information into the telephone manually even though the network may have all of the information in the format that is required. Furthermore, current directory applications within telephones are unable to electronically transfer and receive information from other telephones. For example, an entry from one telephone directory cannot be electronically transferred to a directory within a second telephone. The inability of transferring and receiving entries from directory databases limits the effectiveness and use of the directory within the telephone and consequently the telephone itself.

Occasionally portions of directory entries, which may be referred to herein as entities, need to be modified, while sometimes only portions of entities require modification. For example, when an area code has changed for a given set of telephone numbers within a geographical region, only the area code of the telephone number changes while the base number remains the same. However, current directory applications in telephones are unable to update portions of individual entities since the entities themselves are not structured in segments. This task of updating the entire entity is tedious and is often forgone due to time-consuming steps. This problem may lead to an accumulation of multiple entries for the same name, taking up valuable memory space or leaving the user with conflicting information. The programs of the current applications do not query the listing of directory entries to determine if the entry already exists, thus allowing the potential accumulation of equivalent entries.

In addition to the limitations as noted above, many current telephone directories do not offer an easy avenue of highlighting and removing unused entries. For example, entries of a client that a salesperson no longer calls upon may be overlooked and not deleted, thus taking up valuable memory space. Alternatively, the user may know in advance if an entry is not going to be used after a given period of time or can associate a plurality of entries with a certain identity, so that when the user no longer needs the entries, they can be deleted. Removing unused entries allows the user to organize and access directory entries faster. However, the user must currently remember which entries to remove and delete them manually. Since entry removal is a manual process, the benefit of better organization and easier access is sometimes sacrificed due to the time and effort required to maintain the directory.

It would therefore be desirable to develop an organizational and management system for telephone directories within electronic devices that address the aforementioned limitations. It would further be desirable to develop a system and method allowing communication with another device or database without the requirement of maintaining a line-of-sight path between the two entities, but rather by using the inherently built-in communication capability of the devices. The desired system and method should be simple to use and require minimal effort by the user.

SUMMARY OF THE INVENTION

The problems outlined above are in large part addressed by a system and method for organizing and managing directory entries within electronic communication devices. Electronic communication devices may include, but are not limited to telephones, facsimile machines or electronic organizers. As storage capacity of electronic devices increases and more devices are created that require telephone numbers for product use (i.e., telephones, facsimiles, pagers, etc.), there becomes a need to expand the complexity of organizational structures and directory management systems within directories of electronic communication devices. The most simplified directory management structure within electronic organizational devices is one that contains individual records, commonly called entries, without the categorization of multiple entries. More advanced structures organize entries into groups. An entry may comprise of a variety of information (i.e., a person's name, telephone number, address, etc.), which may be defined as entities. Often entries share a common entity or theme and may be placed in a category defined by that commonality, thus creating a more complex directory management structure. However, current electronic communication device applications limit the categorical management of directory entries to be of a single layer structure. As such, a category cannot have categories within itself, inhibiting the organization of a plurality of entries within an individual category. This simplified structure usually restricts the organization of the entries even further by requiring that all entries be classified into a category. Consequently, the user may place an entry into a category that does not fit into the commonality of the other entries within the category, making it more difficult to locate the entry at a later date. Another restriction often encountered in current electronic communication devices is only allowing an individual directory entry to be contained within one category. For example, a directory entry of a family member or co-worker may fit into multiple categories (i.e., family, work, softball team, etc.). With this single category limitation, the directory entry of the family member may only be located in one category, restricting the efficient use of the directory.

In a method described herein, directory within directories of electronic communication devices may be organized using sets and subsets in a hierarchical fashion. More specifically, a subset may include one or more entries and a set may include one or more subsets, thereby creating a multi-level organizational data structure. Furthermore, directory entries may be also located in sets and on the contrary, directory entries may not be located in sets or subsets at all. This organizational data structure of directory entries, subsets, and sets may then be applied to a directory management system as recited herein to simplify the accessibility and management of directory entries.

Each directory entry is defined by entry content values and identifiers, which are organized into fields. Entry content values, which characterize the information within the directory, may include names, telephone numbers, mailing addresses, or email-addresses. Furthermore, entry content values may include information such as expiration criteria, tag values specific to the entry (i.e., code name, company name), or information defined by the user. Identifiers may be used to distinguish each entry and are presented to the user for access and management purposes in a visual or audible manner. For example, display screens or verbal commands may be used to present the identifiers. Identifiers may be also used to specify names of sets and subsets for the same purposes. The entry values and identifiers within each directory entry may be organized into fields sharing a common entry content value designation (i.e., name, telephone number, mailing address, etc.). The sets and subsets of a directory serve to organize the entries within the directory, while the fields of an entry serve to organize the entry content values within the entry.

The management of directory entries within the multi-level organizational data structure may be maintained by employing a directory management program. The directory management program may be activated by commands initiated by the user. These commands preferably require a negligible amount of manual operation, and thus very little time is required by the user. These commands may include adding, deleting, editing and transferring one or more entries within a directory, with the inclusion of search and sort commands to access and modify entries with common entry content values. The directory management program may also allow the user to manage multiple entries using the same aforementioned commands, thereby simplifying and reducing the amount of time used to manage the entries. Alternatively or in addition, the commands may be used to transfer directory entries from one device to a directory of another electronic device.

Directory management may be required to maintain current entries within a directory. Entry additions are often necessary, for example, when meeting or working with new people. Conversely, entry deletions aid in "cleaning up" a directory to maintain its simplicity and organization.

Removal of entries is often beneficial when individuals have been transferred to a new department within the workplace or when a project has been completed and the corresponding directory entries are no longer needed. Editing is often the most common form of maintaining a directory, stemming from frequent changes in telephone numbers, names and mailing addresses. Transferring entries may allow a user to move entries to a new location within a directory or to other electronic devices. Entries may also be transferred to an electronic device via an electronic database. For example, according to one embodiment of the method as described herein, individuals may transfer directory information from directory assistance into their electronic devices. This transfer feature may reduce the number of entry additions made to directories within the electronic devices, thus reducing the amount of manual operations required. Furthermore, search and sort commands may be used to find specific entries quickly. For example, if a salesperson wanted to look for an e-mail address of a client, but could not remember in what category the client was placed, a search command could be employed to look for the client's name. Alternatively, a sort command could be used to sort all of the directory entries in alphabetical order by entry content values in the name field.

In order to automate modifications to the directory, the device in the method as described herein provides a processor to execute program instructions within the directory management system to complete the given tasks initiated by the user. More specifically, the presently claimed device includes a processor, a storage medium, and an output controller. The processor allows input to be processed through the storage medium to the output controller. The output controller presents information from the storage medium to the user in a format defined in the controller. The storage medium contains the aforementioned multi-level organizational data structure and directory management program. Other mediums may be included in the storage medium or the device itself, such as tracking or transitory mediums as discussed below. The processor is activated by input into the device, either by signal or user-input.

A further embodiment of the method as described herein allows for additional management features to be included in the directory management program. For example, the data structure of the device may be enabled with a field for expiration criteria. A user may enter the expiration criteria for an entry that may be deleted in the future. Expiration criteria may include a date and time, a tag value (i.e. code name, company name), or an area code designation. The date and time specifies a particular date and time to delete the entry, while the tag value marks specific entries to be deleted when initiated by the user. The area code designation specifies that when the device leaves the area code in which the device has been residing, the entries that contain the expiration criteria with that area code designation will be deleted. For-example, if an individual is relocated to a location of a different area code for six months, there may be certain directory entries that the individual may not need after the individual leaves the location (i.e., hairdresser, auto mechanic, etc.). The use of an expiration field eases the task of managing a directory.

As stated above, the directory system of the method as described herein will contain a processor, storage medium and an output controller in which to process the information from input to output. In the current embodiment, the storage medium of the device will also contain a tracking medium in addition to a data structure and directory management program. The tracking medium is used to track the actual date, time and area code in which the device is located. The processor continually or periodically executes program instructions within the directory management program to compare the expiration criteria established within the data structure with the corresponding information values in the tracking medium. Devices may be programmed to alert the user if the expiration criterion of an entry has matched a corresponding information value in the tracking medium, and thus present the user with the option to delete the item. The device may also be programmed to automatically send expired entries to a "delete" file in which the user may not be notified that the file has been removed from the main directory. The user would then access and activate a purge command to ultimately delete the items. In some circumstances, it may be advantageous to automatically delete the items without requiring any user interaction. Thereby, in an essence, the device is self-maintained in deleting expired entries. The user does not have to be "bothered" with the cumbersome task. Enabling the directory with an expiration field preprograms the management of the device, allowing minimal intervention from the user.

As noted above, devices may include transmitting capability between multiple devices. This is particularly advantageous for transferring and receiving multiple directory entries. For example, a person who changes jobs within a company may want to move a plurality of directory entries pertaining to a particular project from her directory to the directory of the person taking the her old job. Another example may have an individual copy his set of directory entries pertaining to his family members to a directory of a device of another family member. The organizational structure of the method as described herein may offer a manner in which to transfer and receive directory entries from one device to another. Once the entries have been selected, the user enters a destination telephone number and the destination device receives the transfer request. The directory system of a device that can receive and transfer directory entries can be of a similar structure of the device described above. In addition to the inclusion of a processor, storage medium, and output controller, a transitory medium exists to enable the transfer and receipt of entries. The transmitting capability also offers communication between a device and a database. For example, directory assistance is a database that is commonly used by customers of a telephone service provider. Other databases include a directory system within a computer network or a simple list of directory information. In the embodiments of accessing a database, the transfer of the entries is only in the direction of the database to the device by utilization of a destination telephone number. Alternatively, the directory entry may be downloaded to the device which activated the database, instead of entering in a destination telephone number. Alternatively, the entry may already exist in the directory of the device. Therefore, the program instructions executable by the processor initiate a search of all of the directory entries within the second device to search for any matching entry content values and then asks the user if the two entries are the same. If the user selects that they are the same, the processor executes program instructions to update the rest of the entry content values with the transferred entry.

The communications interface between the electronic communications device and the user of the method as described herein allows quick and easy accessibility and management of directory entries. The device may be programmed to present and receive information to and from the user. Presenting includes visual or audio presentations, whether the entries are presented on a display screen or by audible instructions. Receiving may include receiving a vocal command or a dual tone multi-frequency (DTMF) tone. In certain instances, devices are adapted to communicate with other electronic devices utilizing directory management systems. These communications include transmitting and a different form of receiving. Transmitting comprises automatically dialing a telephone number designated to another device or sending digital messages for the other device to present. The other form of receiving includes receiving transmitted information from the other device.

Directories as used in the applications recited herein refer to information databases within electronic organizational devices in which to store information regarding a particular individual, organization, or place. The information is programmed into the device by the user via a manual data-entering process or downloading the information via a transmitting signal. The directories are protected from modifications not authorized or programmed by the user, thus only allowing the user to manage and obtain access to the directory of the device. The structure of the directory entries within the method as described herein is adaptable to directory entry structures of other organizational devices in that information can be transferred in the same format.

Prior to the invention of the method as described herein, such multi-level organization data structures and directory management programs did not exist in directories within electronic communication devices. As society requires more and more tools to organize such matter, the need to create a directory with such organizational and management systems within an electronic communication device grows. There has also become a driving need to have portable organizational tools in which directory information can be readily available. The multi-level organizational data structure and directory management program within the system as described herein meets these demands and offers consumers alternative options with which to organize directories within their electronic communication devices.

The system and methods as described herein may offer several advantages over present organizational tools. They minimize the tedious, manual operations of maintaining directory entries and thus, aid in optimizing the efficiency of using a directory and the use of the device in which the directory is placed. The multi-level organizational data structure and directory management program allow the user of a device to quickly locate a given entry or multiple entries, in addition to managing multiple entries at once. In some instances, as discussed above, the user does not have to initiate the directory management program to update the directory entries within the device.

The system and method as described herein may allow the organization and management of a directory system within an electronic communications device in a concise and structured manner. Directory entries may be managed within organized sets or subsets or independently. Due to the increase of people using portable electronic organizers and capacity of which the devices can hold, more entries are being placed into the devices and thus a more organized structure and system is needed.

BRIEF DESCRIPTION OF THE DRAWINGS

Other objects and advantages of the invention will become apparent upon reading the following detailed description and upon reference to the accompanying drawings in which:

FIG. 8 is a flow diagram illustrating the process of removing directory entries from a directory based on established expiration criteria;

FIG. 9 is a flow diagram illustrating the process of moving directory entries from a directory to a purge file based on established expiration criteria;

FIG. 13 is a block diagram of two directory systems within electronic devices communicating with each other.

Figure 1:
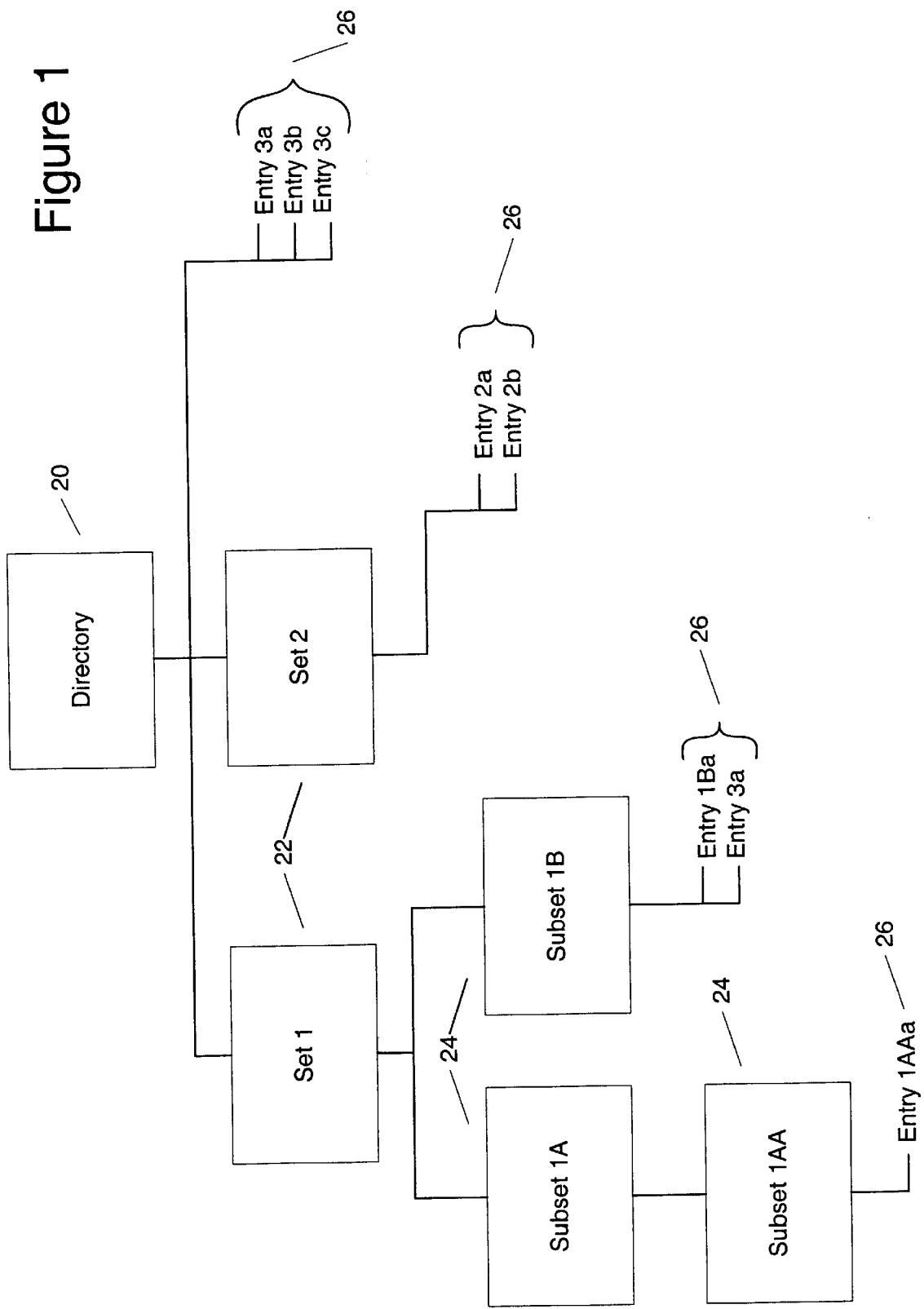
FIG. 1 illustrates a multi-level organizational data structure.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates an example of a multi-level organizational data structure. Directory 20 is a directory contained within an electronic communications device, which may include, but is not limited to telephones, facsimile machines, or electronic organizers. Directory entries 26 within directory 20 are organized using sets 22 and subsets 24. A set is defined as including at least one subset or at least one entry; and a subset is defined as including at least one entry. As indicated in FIG. 1, the first layer below directory 20 may include one or more sets 22 (i.e., Set 1 and Set 2) and directories entries 26 (i.e., Entry 3a, Entry 3b and Entry 3c). Alternatively, the first layer may not include any directory entries 26. The second layer below directory 20 may include one or more subsets 24 (i.e., Subset 1A and Subset 1B) or directory entries 26 (i.e., Entry 2a and Entry 2b). Additional layers may be formed as well. For example, Subset 1AA, Entry 1Ba, Entry 3a and Entry 1Aaa makeup the $3^{rd}$ and $4^{th}$ layers of directory 20 in FIG. 1. In the embodiment of FIG. 1, directory 20 contains 4 layers, but the device as described herein is not limited by the number of layers that a directory can contain. In fact, the design of the case cited herein ultimately allows the number of layers created within the directory to be left to the discretion of the user or the capacity of the device. In addition, the multi-level organizational data structure of the device as described herein may also comprise a directory entry in multiple sets or subsets. For example, Entry 3a of directory 20 is located in two locations, once within Subset 1B and the other in the $1^{st}$ layer of directory 20.

Some embodiments of the systems and methods described herein include an organization of directory entries within sets and subsets. A group of entries may be designated as either a set or subset, depending on the point of reference using in describing the group: For example, a set as used herein includes at least one subset or at least one entry. However, the directory itself may be viewed as a set since it belongs to a plurality of features contained within an electronic communications device. In this interpretation, the directory entries are organized into the directory set and further organized into subsets created within the directory set, including subsets within a multi-level organizational data structure. Thus, the directory set may contain multiple subsets. For example, directory 20 of FIG. 1 may be considered a set and sets 22 may be considered subsets along with subsets 24 created within them. Alternatively, such an organization may be viewed as multiple sets and subsets within the directory. A set could be viewed as a subset within the directory set or a set of one or more subsets. For example, Set 1 of FIG. 1 could be designated as Subset 1 of the Directory; while Subset 1A could-be designated as a subset to Set 1. Set 1 and Subset 1 in this example thereby would be the same. Although the embodiment of FIG. 1 does not designate directory 20 as a set, such an interpretation may be used in all embodiments described herein.

Figure 2:
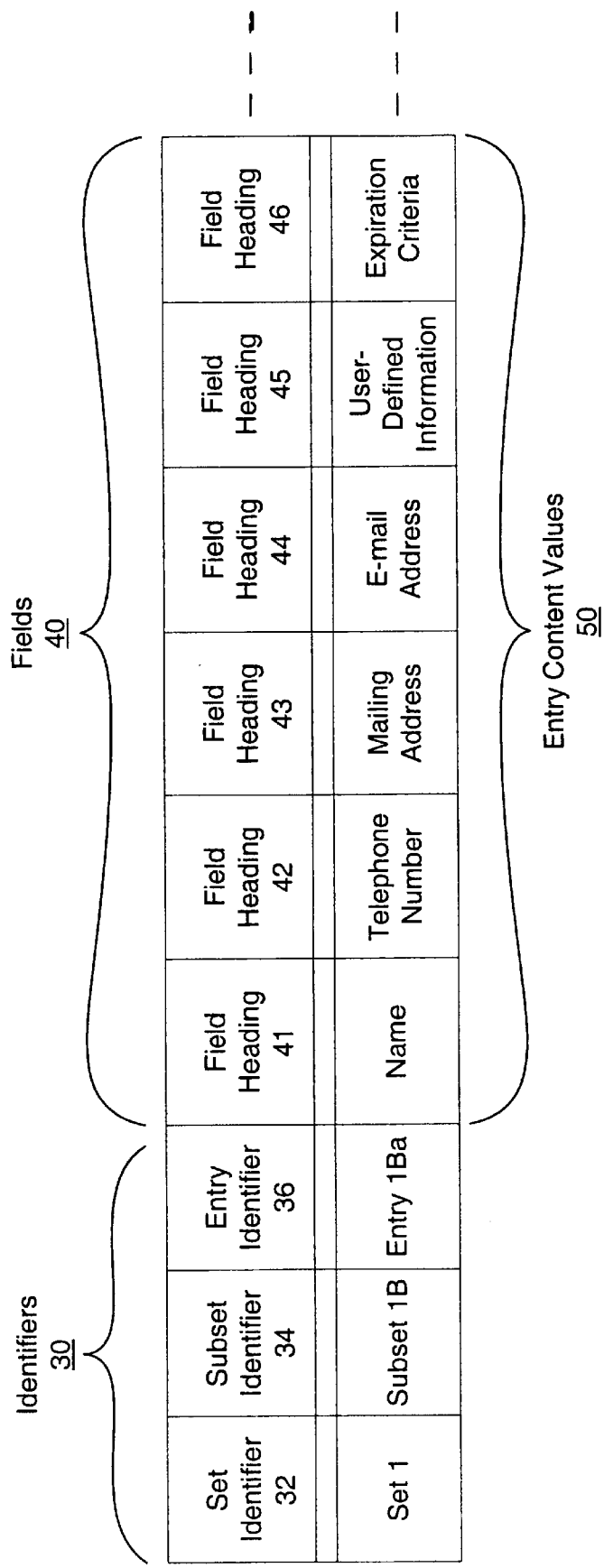
FIG. 2 illustrates the structure of the directory entries within the organizational structure of FIG. 1.

FIG. 2 outlines a data structure in which directory entries are organized within a directory. In particular, directory entry Entry 1Ba from FIG. 1 is illustrated. Directory entries may be defined as a series of information relating to a person, place or thing. A directory is an information reference containing a collection of directory entries placed into an organizational structure. Directory entries within the data structure of FIG. 2 are labeled by identifiers 30, more specifically, set identifier 32, subset identifier 34 and entry identifier 36. The identifiers of Entry 1Ba (Set 1, Subset 1B and Entry 1Ba) as defined in FIG. 1 are placed into the corresponding categories of the data structure of FIG. 2. The second portion of the data structure organizes directory entries into fields 40 in which the specific entry content values 50 of the directory will be placed. Entry content values comprise the information which the directory entries contain. As shown in FIG. 2, entry content values may contain, but are not limited to, names, telephone numbers, mailing addresses, e-mail addresses, user defined information, or expiration criteria. User-defined information may include code names or information utilized by the user of the device, such as birth dates or gift ideas. Fields 40 contain field headings 41–46 referring to the type of information to be placed in the corresponding field. These field headings may be preprogrammed or user-defined. Other fields may be included in the data structure of FIG. 2, as indicated by the dashed lines following field heading 46 and the entry content value of expiration criteria. As with the number of possible layers within a directory, the data structure cited herein is not limited by the number of fields it can contain.

Figure 3:
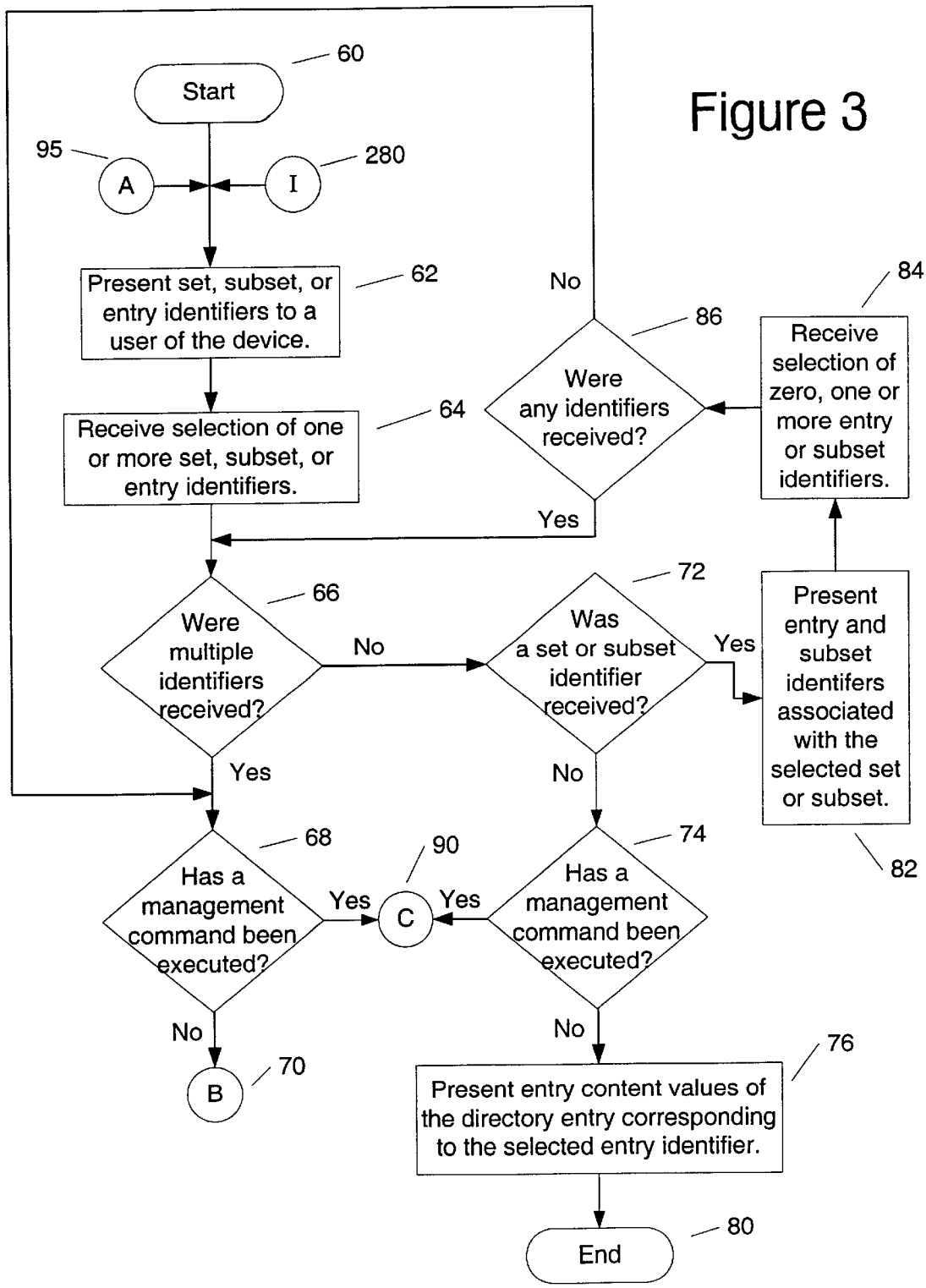
FIG. 3 is a flow diagram illustrating the process of presenting entry content values associated with a directory entry or selection by the user.

Turning now to FIG. 3, a flowchart is shown to illustrate the steps of selecting a directory entry, subset or set for further processing by a management command. It also shows how to present the entry content values associated with a selected directory entry to a user of an electronic communications device in which a directory is placed. Hereinafter, a device is defined as an electronic communications device in which a directory is placed and user will be defined as a person using a device. The process is started at step 60 of FIG. 3. Step 60 may be executed by a start command activated by the user or it may always be enabled, allowing the user to access the process at any time. More specifically, the task of simply supplying power to a device containing the cited directory system may activate step 60. Interconnects A and I at steps 95 and 280, respectively, join step 60 and are explained in further accompanying figures. The next step is process step 62 in which set, subset and entry identifiers are presented to the user. This first presentation is typically the identifiers corresponding to the sets and directory entries of the first layer of the directory organization data structure. For example, the layer in which Set 1, Set 2, Entry 3a, Entry 3b and Entry 3c consist in FIG. 1 would be presented. Alternatively, the presented layer of set, subset and entry identifiers may be of a different layer than of the first layer of the organizational data structure. This option may be preprogrammed by the user in order to increase the efficiency of the device. The identifiers may be presented in a variety of manners, including displaying characters on a display screen of the device or providing audible communication. Step 64 follows by receiving a selection of one or more of the presented set, subset or entry identifiers. The user of the device may make the selection by a variety of means, including using vocal commands, activating a device actuator, or supplying a pre-assigned dual tone multi-frequency (DTMF) tone. Either of the latter two options may utilize a screen on which the identifiers may be displayed and highlighted by the selection device.

The flowchart in FIG. 3 continues to step 66 in which the directory management program recognizes whether multiple identifiers have been received. In the case that multiple identifiers have been received, step 68 follows and determines if a management command has been executed. As will be discussed in FIG. 4, the directory management program may also be activated by first executing a management command and then selecting one or more entries, subsets, or sets to be managed. Interconnects A and B allow both process sequences. Step 90 leads the path of an executed management command via interconnect C, as will be discussed in FIG. 4 below. If a management command has not been executed at step 68, step 70 leads interconnect B to FIG. 4 to wait for a management command to be executed.

Referring back to step 66, the process route of the program turns to step 72 in the event that only one set, subset, or entry identifier is received in step 64. Step 72 determines whether a set or subset identifier has been received, in order to give the user the opportunity to select one or more directory entries or subsets within the set or subset associated with the selected identifier. In the event that only one entry identifier was received in step 64, step 74 would follow step 72. Again, the directory management program then determines if a management command has been executed. As in step 68, if a management command has been selected, step 90 is followed by interconnect C to FIG. 4. However, in step 74, if a management command has not been executed, step 76 results in presenting the entry content values of the directory entry associated with the selected identifier to the user and then ending with step 80. In an alternative embodiment (not shown), selection of individual entry content values presented in step 76 may be received and then a management command may be executed by interconnect B or C.

Stepping back to step 72 and following the path where a set or subset identifier has been received, step 82 follows by presenting the subset and entry identifiers associated with the selected set or subset. Subsequently, process step 84 receives the selection of zero, one, or more subset or entry identifiers. This step differs from step 64 in that one or more subset or entry identifiers do not have to be selected by the user. This process variation offers the user the option of managing a set or subset as a whole or managing individual subsets or entries within the selected set or subset. The route including step 84 allows a user to access individual entries within a subset and subsequently present the entry's corresponding entry content values through step 76. Step 86 follows step 84, determining if any identifiers are received. In the case that one or more identifiers are received, the route returns to step 66 and resumes the paths thereafter. Thus, a programming loop is created offering the user the option of selecting directory entries in the deeper layers of the multi-level organizational data structure. In the event that no identifiers are received in step 84, step 86 leads to back to step 68 in which interconnect B is followed in step 70 if a management command has not been executed and interconnect C is followed in step 90 if a management command has been executed. It should be noted that at any given time within the process steps of FIG. 3 or any other figure featuring process steps of the case cited herein, the directory management program may be canceled by activating an exit command. This embodiment is not shown within the drawings, but is understood to exist within all process steps of the directory management program.

Figure 4:
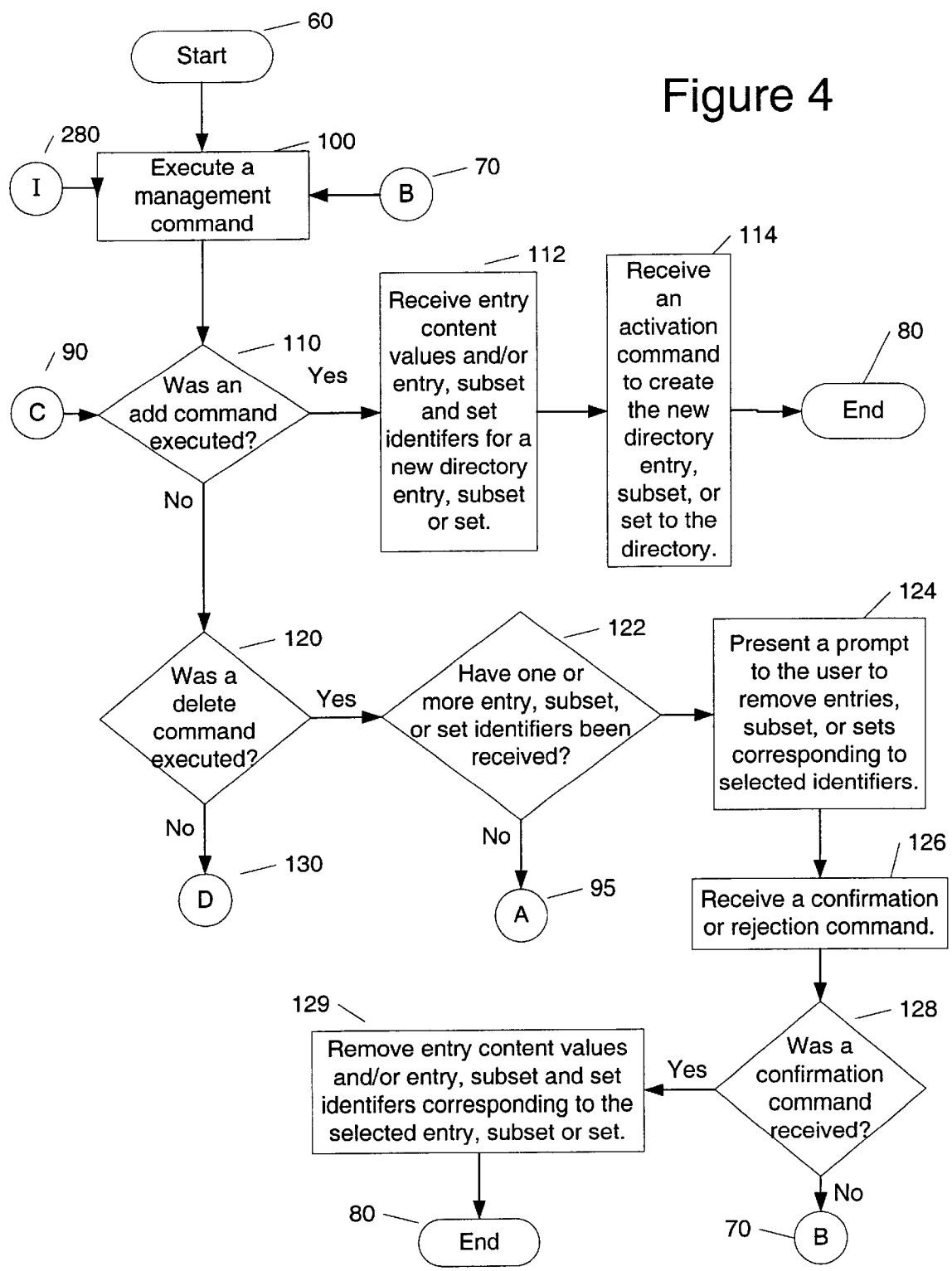
FIG. 4 is a flow diagram illustrating the process of adding and deleting a set, subset or directory entry within a directory.

The directory management program process steps of managing one or more directory entries, subsets or sets are presented in FIGS. 4–10. FIG. 4 starts with step 60, the same start action of FIG. 3. Again, this action may be initiated by the user or simply be activated at all times. Step 100 allows the device to execute a management command after step 60 and interconnects I and B at steps 280 and 70, respectively. Steps 280 and 70 are featured in later figures and will be discussed at that time. The activation of a management command may be defined as being received and subsequently executed by the user. Receiving may alternatively be defined as obtaining the management command within the directory management program. All three terms (received, executed and obtained) are used interchangeably within present description to encompass the receipt and activation of the management command. Once a management command has been executed, step 110 follows and determines if the executed command is an add command. At this point, interconnect C as discussed in FIG. 3, joins the system. In the event that an add command was indeed executed, step 112 follows by receiving entry content values and an entry identifier for a new directory entry or new set or subset identifiers for creating a new set or subset. Step 114 then receives an activation command to create the new directory entry, subset, or set. Step 80 follows ending the process sequence. At this point, the user is typically returned to the start position of FIG. 3 or 4, but other embodiments (not illustrated) may offer alternative options of returning to the add command step function of 112 to add more entries, subset or sets. Another alternative (not shown) would return the directory management program back to execute a new management command through Interconnect B.

If the management command executed is not an add command, the directory management program continues to step 120 to determine if the command was a delete command. In the event that a delete command was executed, the program recognizes in step 122 if one or more entry, subset, or set identifiers have been received. If the routing process started with step 100 directly following step 60 as is indicated as one option in FIG. 4, one or more identifiers still need to be selected for deletion. This process is completed through interconnect A at step 95. Interconnect A returns to subsequent step 62 as shown in FIG. 3. When an individual or group of entries, subset or sets have been selected, the program route returns back through interconnect C at step 90, since a management command has already been executed. Interconnect C returns to subsequent step 110, which leads to step 124 through 122. If the user started the management process by selecting one or more directory entries, subsets or sets through the process presented in FIG. 3, then step 124 would automatically follow step 122 without using interconnect A through step 95. Step 124 presents a prompt essentially asking the user to confirm or reject the removal of the directory entries, subset or sets associated with the selected identifiers. Subsequent step 126 either receives a confirmation command or rejection command from the user. The directory management program offers two process routes at step 128, depending on which command was received in step 126. In the event that the user decides not to remove the entries, subset or sets associated with the selected identifiers, a rejection command is received in step 126 and the process is returned to receive an alternate management command through interconnect B of step 70. In this case, the selected identifiers remain intact, so that the user may continue the management of the selection. In the event that the user continues with the process of removing the entries, subsets or sets associated with the selected identifiers, a confirmation command is subsequently recognized by the directory management program in step 128. Then, step 129 follows to remove the entry content values and entry identifiers associated with the selected entries, subset, or sets. The removal process may either delete the entry or move it to a delete set, wherein the user may subsequently delete the file form the directory. Either option may be preprogrammed into the device or preselected by the user. The process is completed with a termination of step 80.

Figure 5:
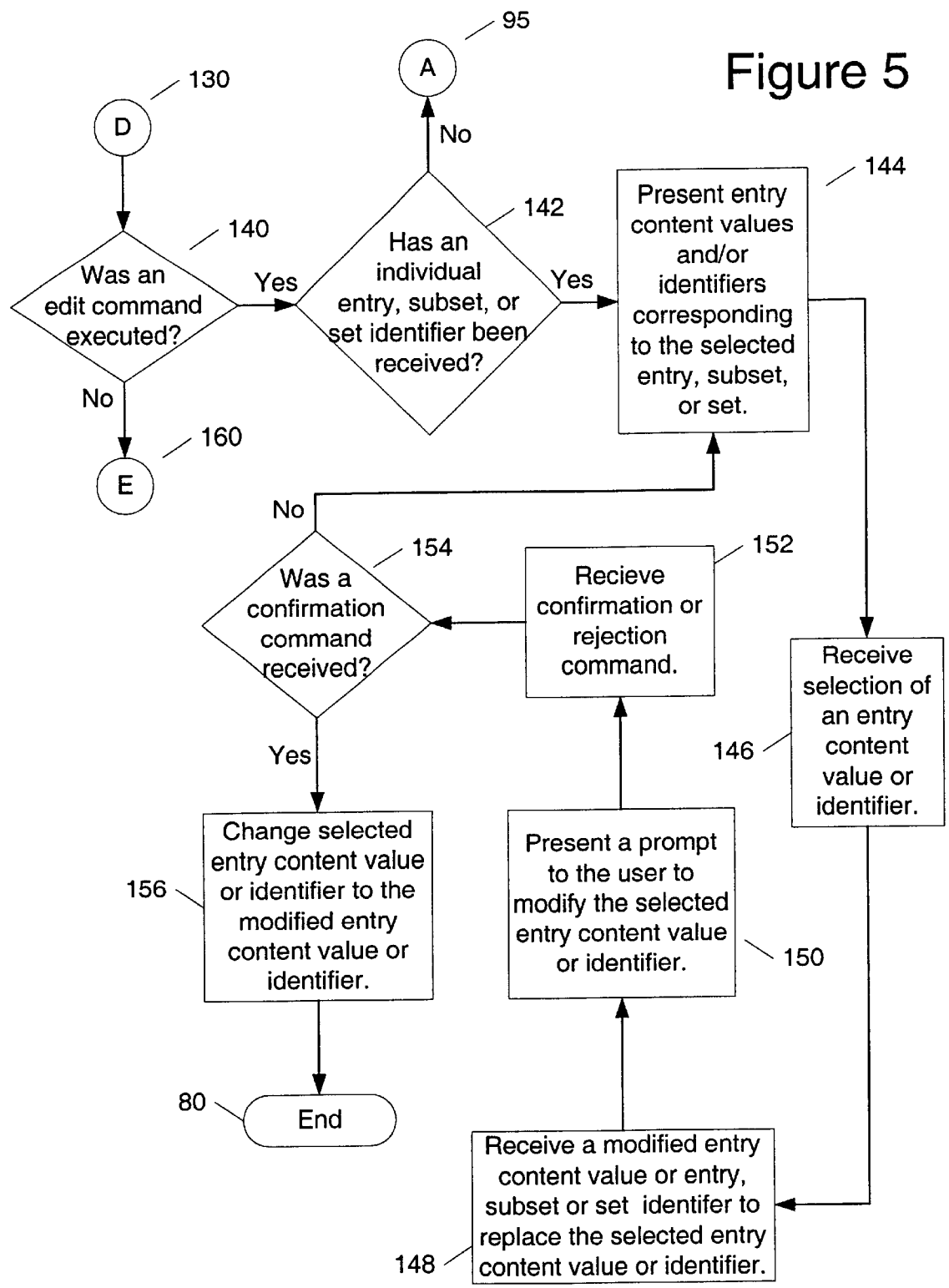
FIG. 5 is a flow diagram illustrating the process of editing a directory entry within a directory.

Turning now to FIG. 5, interconnect D at step 130 continues the process of managing directory entries, subsets and sets associated with selected identifiers if an add or delete command was not executed in FIG. 4. Step 140 follows step 130 to determine if an edit command has been executed. In the event that an edit command has been executed, step 142 follows to determine if a single entry, subset or set identifier has been received. Similar to step 122 of FIG. 4, if a single entry, subset or set identifier has not been received, the process follows step 95 of interconnect A to select an directory entry, subset or set to be modified. Alternatively, multiple identifiers may be selected. The edit process would then enable the user to modify an entry content value associated with multiple entries. This embodiment is not shown, but is inherent to the objective of the method as described herein, which is to present a method of organizing information within a directory and offering a method to manage the information within the organized structure. In the event that a single entry, subset or set has been selected, the process leads to step 144 to present entry content values or identifiers corresponding to the selected entries, subsets, or sets. In the alternative embodiment discussed in reference to FIG. 3, this step may already be complete and thus step 144 could be skipped.

Moving on to step 146, the program receives selection of an entry content value or identifier to be modified. Subsequent step 148 receives the modified entry content value or the modified identifier corresponding to the selected entry, subset, or set. Step 150 follows with the presentation of a prompt to the user to modify the selected entry, subset or set.

As with step 126 of the delete command, subsequent step 152 either receives a confirmation command or rejection command. In the event that a rejection command is received, step 154 then reroutes the program back to step 144 to present the entry content values or identifiers of the selected entry, subset or set again. This allows the user to reselect an entry content value or identifier to be modified and reenter the modifications. Alternatively and as noted previously, the user may at any time choose to exit the directory management program by activating an exit command. If the user does decide to make the changes as originally entered in step 148, a confirmation command would be received in step 152 and thus, the selected entry content values or identifiers would be changed to the modified entries through step 156. The management process would then be completed by the termination of step 80. Alternate embodiments (not shown) may allow the user to return to step 144 after step 156 or any other step in the process in order to modify other entry content values or identifiers within the selected entries, subsets, or sets.

In the event that an add, delete or edit command has not been executed, the process outlined in FIGS. 4 and 5 continues through interconnect E at step 160. Step 160 starts in FIG. 6 and leads to step 170, where the directory management program determines if a transfer command has been executed. As in step 122 of FIG. 4, the program determines if one or more entry, subset or set identifiers have been received at step 172. In the event that a selection has not been made, the program is routed through interconnect A at step 95 to go back to FIG. 3 to select one or more entries, subsets or sets to be transferred. However, if one or more identifiers have been received, step 172 leads to step 174 to present a prompt to the user to specify whether the directory entries corresponding to the selected identifiers will be transferred to an internal location within the directory of the device or to a directory within an external device. Step 176 follows, receiving an internal or external request to indicate whether the location is internal or external to the device. Step 178 determines whether an internal request has been received. If an internal request is not received, the process route continues to step 180, wherein a telephone number of an external device is received. The external device contains a directory in which the selected entries will be transferred. Step 182 follows wherein a descriptor is received for the selected entries. A calling signal is then transmitted to the external device in step 184. Subsequent step 186 transfers the selected entries to the received destination. Step 188 follows with a confirmation statement stating whether the selected entries were successfully transferred into the received destination. The process is completed by termination step 80.

The aforementioned transfer command may consist of either moving or copying one or more selected entries, subsets, or sets to a receiving destination. Moving is defined as removing the selected entries from the location in which they reside and transferring them to a receiving destination. Copying is defined as simply copying the selected entries and placing a copy in the receiving destination, so that the selected entries, subset, and sets are positioned in the original and new location. A device may be preprogrammed to perform either designated function automatically upon the activation of the transfer management command. Alternatively, the user may select to either copy or move the selected entries in an additional process step in FIG. 6 (not shown). For example, the additional step may be included after step 170 or step 176. And still another embodiment may substitute individual copy and move commands for the transfer command recited herein. More specifically, copy and move commands would be available to the user instead of a transfer command. Both of these commands would follow the process steps outlined in FIG. 6.

Following the route of the internal request receipt in step 176, is step 196, which receives the selection of a destination subset or set within the directory of the device in which to transfer the selected entries, subsets or sets. The process described in FIG. 3 outlining the selection of a set or subset may be used. Step 198 is then used to present a prompt to the user to either accept or reject the transfer of the entries. The directory management program then receives either a confirmation or a rejection command through step 200. In the event that a rejection command is received, the program routes back to step 196 in order for the user to reselect an internal destination subset or set. As with the management commands of FIGS. 4 and 5, several other alternative routes are available depending on the need of the user. These embodiments are not shown, but are encompassed by the method as described herein. However, if a confirmation command is received in step 200, then step 202 leads to step 186 to transfer the selected entries to the receiving destination. Again, step 188 then presents a confirmation statement to the user to state that the selected entries were transferred to the received destination and then termination step 80 completes the process.

The device described herein is also adapted to receive transferred directory entries from other devices as is the device described herein is able to transfer entries to external devices. This process is outlined within the flowchart of FIG. 6. The entry receipt process starts with step 60 and moves to step 190, wherein one or more transferred directory entries, subsets or sets from another device are presented to the user, along with an acceptance prompt to either accept or decline the transfer of entries. Step 192 either receives an accept command or denial command. If the denial command is received, step 194 sends the program to termination step 80. If an acceptance command is received at step 192, then step 194 leads to step 196, wherein a subset or set within the directories is selected as the destination site for the transferred entries. As before, step 198 presents a prompt to the user to transfer the entries to the destination subset or set, step 200 receives either a confirmation command or rejection command, and step 202 directs the process route based on the command received in step 200. If a rejection step is received, the process is routed back to step 196 to reselect a subset or set in which to transfer the received entries. An alternative route (not shown) would enable the user to exit the directory management program, thus not allowing the received entries to be transferred to the directory. If a confirmation command is received at step 200, the process continues to step 186 to transfer the selected entries to the received destination. Step 188 follows by presenting a confirmation statement to the user indicating that the selected entries have been successfully transferred. Step 80 ends the process with a termination step.

Figure 6:
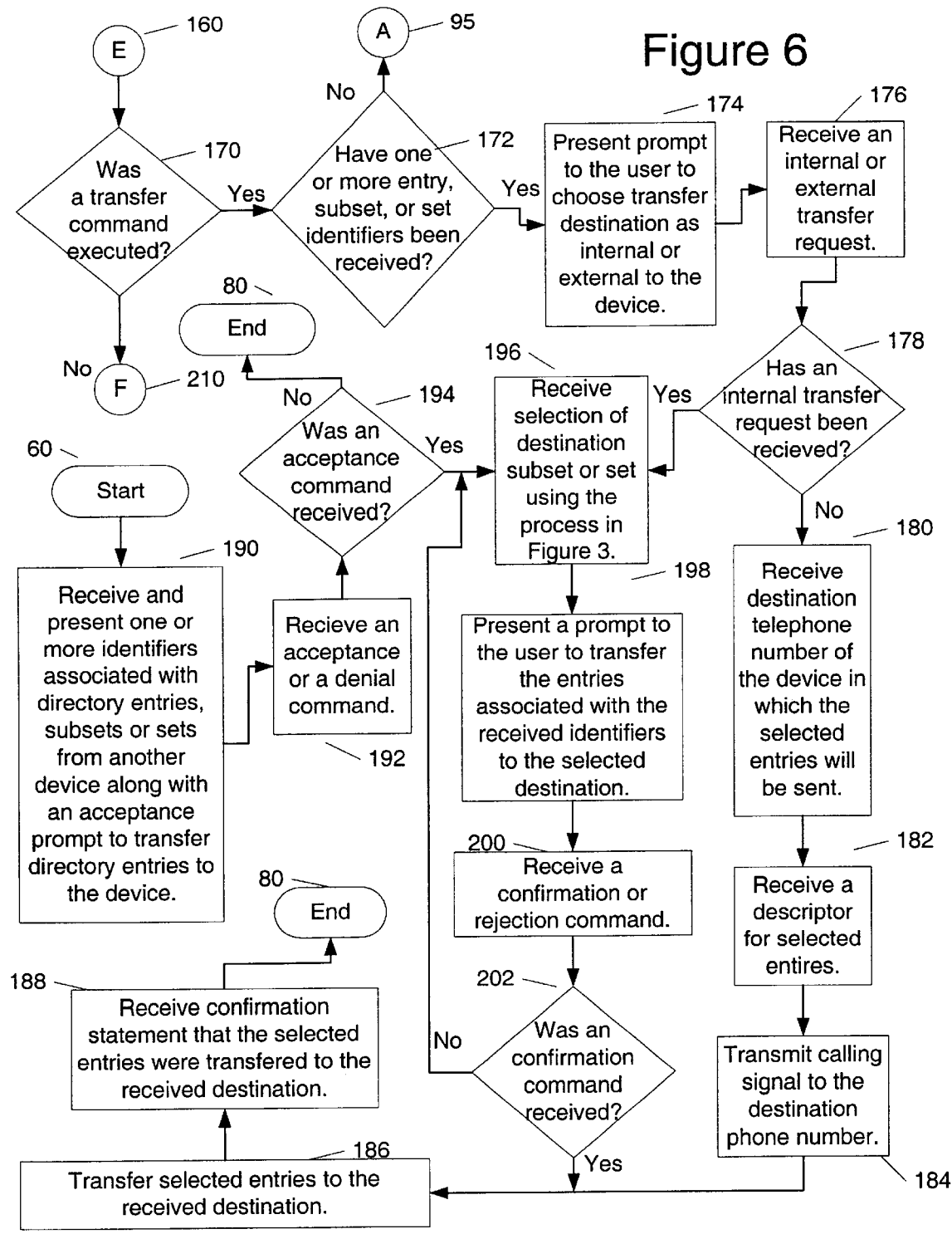
FIG. 6 is a flow diagram illustrating the process of transferring a entry, subset or set within a directory and to a second electronic device.
Figure 7:
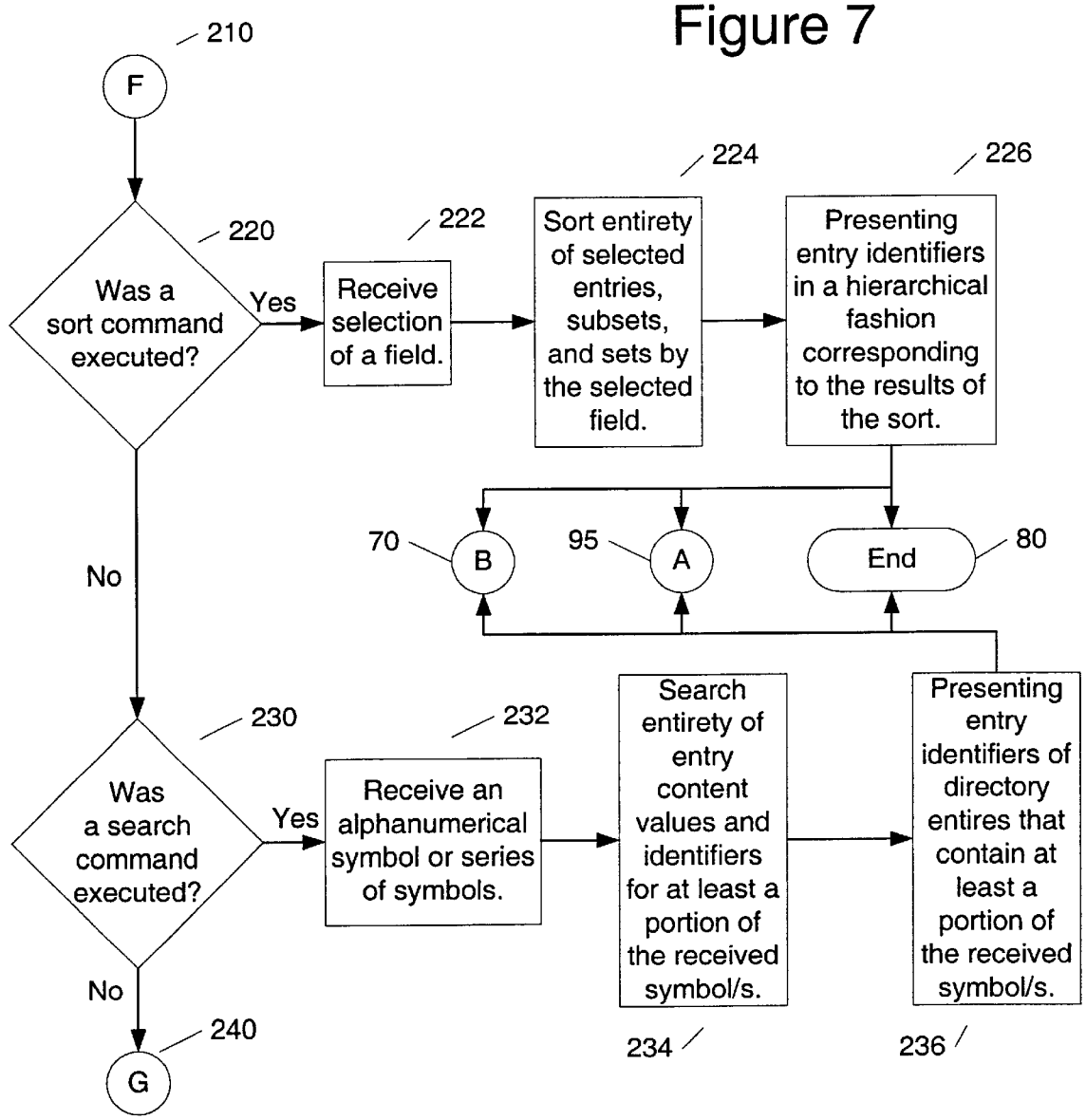
FIG. 7 is a flow diagram illustrating the process of sorting and searching for a directory entry within a directory.

Referring now to FIG. 7, the entry management execution process started in FIGS. 3 and 4 and continuing through FIGS. 5 and 6 still continues in FIG. 7 through interconnect F, step 210. The following step, step 220, determines if a sort command has been executed. In the circumstance that a sort command has been executed, step 220 leads to step 222, which receives a selection of a field among the selected entries. A field is defined as a category within the data structure of the directory in which entry content values are contained as shown in FIG. 2. Step 224 follows by sorting the entirety of selected entries, subsets and sets by the selected field. The entry identifiers of the sorted entries are presented to the user in step 226 in a hierarchical fashion corresponding to the results of the sort process of step 224. The process may then end at step 80 or continue to interconnects A and B, steps 95 and 70 respectively. The route of interconnects A and B allow the user to select identifiers associated with entries, subsets, and sets found from the results of the sort process to subsequently present entry content values or manage entries of the selected identifiers. In an alternative embodiment, no entries will have been previously selected and thus, all entries within the directory will be sorted by the field selected in step 222. This embodiment is illustrated by starting the directory management process in FIG. 4 with a sort command. A further embodiment (not shown) may yet still be incorporated by implementing a route to select one or more entries, subsets or sets after process step 220 in which a sort command has been executed. This may be accomplished by placing interconnect A off of step 220 and then rerouting the selection of entries back to step 222.

In the event that a sort command has not been executed, step 220 will continue to step 230, which determines if a search command has been executed. The receipt of a search command leads to step 232, in which an alphanumerical symbol or series of symbols is received. Step 234 follows by searching the entirety of entry content values and identifiers for the received symbol or symbols. Then step 236 presents entry identifiers of directory entries that contain at least a portion of the received symbol or symbols. The process may continue by selecting one or more of the presented identifiers through interconnect A, step 95 or the process may continue to receive a management command through interconnect B, step 70. Alternatively, the process may end at step 80. If neither a sort command nor search command is received in FIG. 7, the process continues through interconnect A, step 240, to other management commands that may be programmed into the device. The present embodiment does not limit the number of management commands available for the device.

An alternative option that may be incorporated into electronic devices is the establishment of expiration criteria for one or more directory entries. This feature would allow the user to establish expiration criteria for a directory entry in order to automatically remove the entry from the directory upon expiration. The expiration criteria may comprise of a date or time, a tag value, an access frequency value, and an area code assigned to the vicinity in which the device containing the cited directory, management program is located. At a value is defined as a descriptor or symbol, in which to place one or more entries into a group not necessarily defined within a set or subset. For example, a user may be working with several individuals from different companies on a project. The individual could enter in the project name as the tag value and then delete all entries associated with the project once the project is complete. An access frequency value references the amount of times an individual entry has been accessed in a given time period. A user may enter an access frequency value as an expiration criterion of an entry so that once the access frequency falls below that value, the entry is removed from the directory. Expiration criteria may be entered into a directory upon creation of an entry or later as a modification to the entry. This data entry may follow the process outlined in FIGS. 3–5 in which directory entries are selected, added, and edited. The benefit of establishing expiration criteria allows the directory to be relatively self-maintained. Unused or expired criteria may be deleted, thus allowing more storage capacity for other information.

Two means in which to remove expired entries from a directory containing a directory management program as cited herein are outlined in FIGS. 8 and 9. Both means follow the same process steps except for the manner in which the expired entries are removed from the directory. FIG. 8 illustrates the deletion of an expired entry, while FIG. 9 illustrates the transfer of an expired entry to a delete set where it is stored for further processing. Both situations start with step 60 and lead to step 300 wherein the expiration criteria within an individual directory entry is retrieved. The corresponding information value in the tracking medium is retrieved in subsequent step 302. The corresponding information values in the tracking medium relate to the current status of the device. As with the expiration criteria, the corresponding information values may track date or time, access frequencies, or the area code in which a device containing the cited directory management program is located. Step 304 follows by comparing the expiration criteria retrieved in step 300 to the information values received in step 302. Step 305 determines whether the values retrieved in steps 300 and 302 are the same. In the event that the values do not match, the process route is returned back to step 300 to retrieve expiration criteria from another directory entry. However in the case in which the values are the same, step 310 of FIG. 8 illustrates that the removal of the expired entry from the directory entirely. Step 320 in FIG. 9 moves the expired entry to a delete set for subsequent processing. The delete set referenced in FIG. 9 is the same delete set referenced in the previous discussion regarding the delete management command. In either embodiment the step following step 310 and 320 is step 300, wherein an expiration criteria of another directory entry is retrieved.

Figure 10:
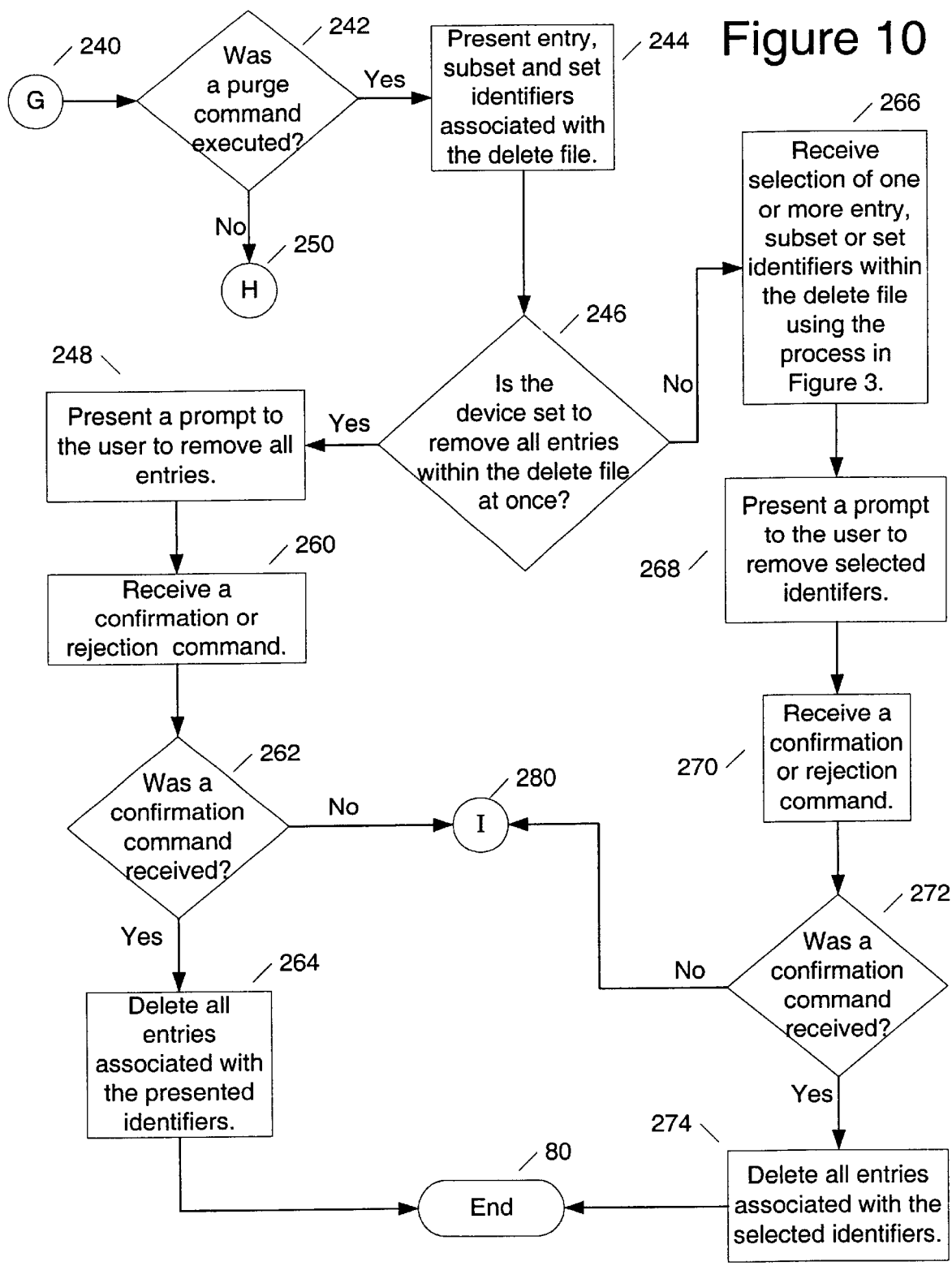
FIG. 10 is a flow diagram illustrating the process of removing expired directory entries from a purge file.

In the embodiment that a delete set is used for the removal of expired entries, the flowchart outlined in FIG. 10 may be used to illustrate the process of deleting the expired entries from the delete set. The process starts by executing a purge command in FIG. 4 and through interconnect G, step 240 connects the management command to subsequent process steps. Step 242 follows by determining if a purge command has been executed. In the event that a purge command has not been executed, FIG. 10 illustrates that additional management commands may be incorporated into the embodiment through interconnect H, step 250. However, if a purge command has been executed, step 244 is pursued to present identifiers associated with entries, subsets and sets stored within the delete set. Step 246 then determines if the device is set to remove all entries within the delete set at once. This setting may be pre-programmed into the device or it may be activated by the user within the programming instructions of the device. In the event that the device is set to remove all of the entries at once, step 248 follows by presenting a prompt to the user to remove all entries within the delete set. Either a confirmation command or a rejection command is received in step 260. Subsequent step 262 determines the process route of the program depending on the command received in step 260. If a rejection command has been received, step 262 will continue to interconnect I through step 280. Interconnect I may be followed back to FIG. 3 or FIG. 4 to select and transfer one or more entries from the delete set back to the directory of the device. In the event that a confirmation command is received in step 260, step 264 will follow by deleting all of the entries stored within the delete set followed by end step 80.

Turning back to step 246 of FIG. 10 wherein the device is not set to remove all of the entries within the delete set at once, step 266 follows by receiving selection of one or more entries, subsets, or sets within the delete set by the method as described in FIG. 3. A prompt is then presented to the user through step 268 to remove the directory entries associated with the selected identifiers. Step 270 receives either a confirmation or a rejection command, while step 272 determines the process route of the program by the command received. If a rejection command is received, interconnect I may then be followed through step 280 to either select alternative entries to be deleted from the delete set or transfer entries from the delete set back to the directory. In the event that a confirmation command is received in step 270, all entries associated with the selected identifiers will then be deleted in step 274. The process is completed by end step 80.

Figure 11:
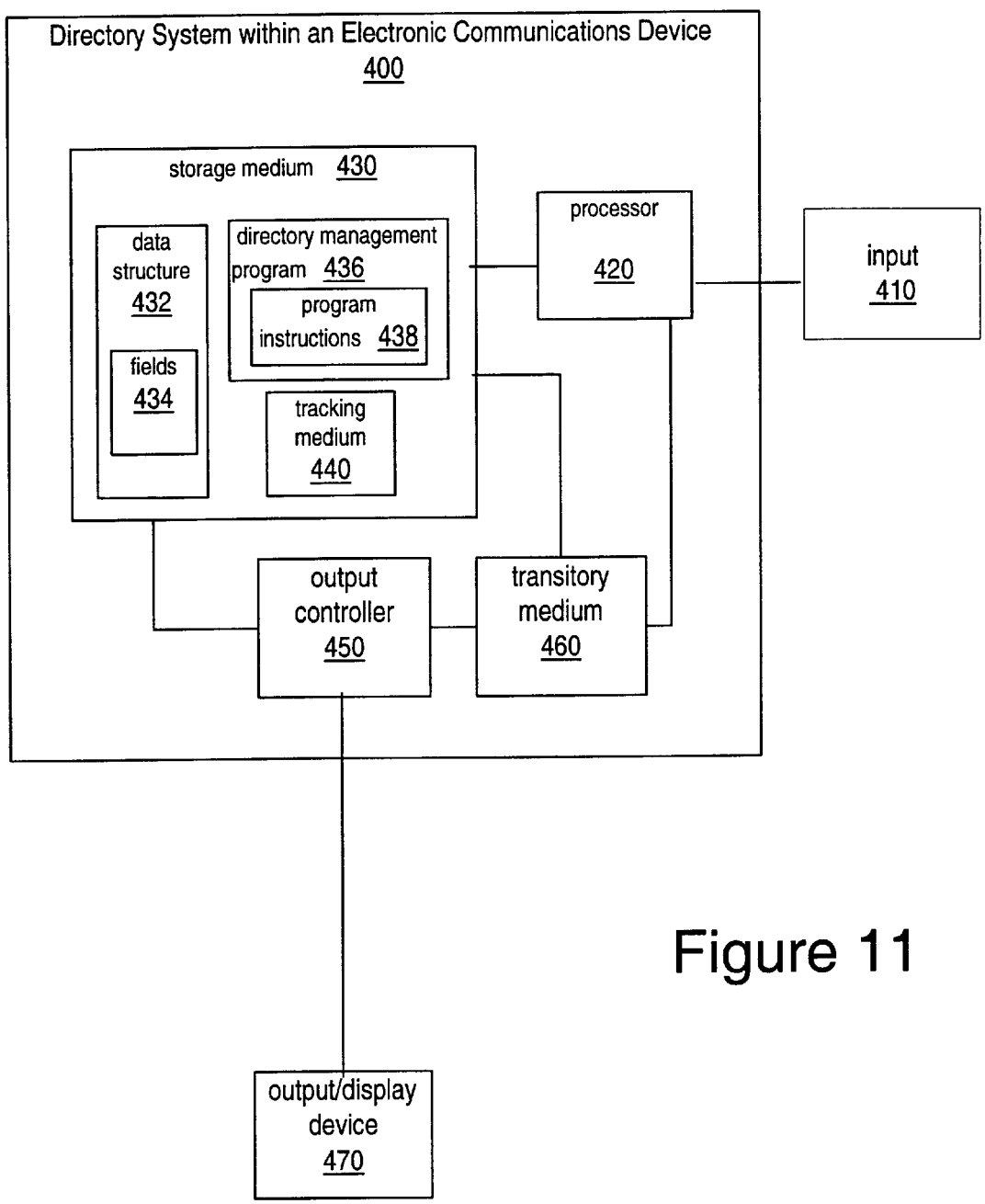
FIG. 11 is a block diagram of a directory system within an electronic device.

FIG. 11 presents a block diagram of directory system 400 within an electronic communications device. Input 410 activates preprogrammed commands to initiate processor 420 to execute program instructions 438 within directory management program 436. Input may include but is not limited to entry selection by the user, messages and entries sent from other electronic devices, or information downloaded from a database. The input may be activated by selecting options or commands by an actuator on the device while the information is displayed on the device screen or while the information is given in audible instructions. Input may also be activated by a selecting options or commands on a touch-sensitive pad or by vocal commands. The directory management program is contained within storage medium 430 of directory system 400. Storage medium 430 also includes data structure 432 which is adapted to organize directory entries into sets and subsets as indicated in FIG. 1. Data structure 432 includes fields 434 for the storage of entry content values including set or subset identifiers associated with each directory entry. Storage medium 430 also includes tracking medium 440 for tracking information relative to the current status of the device. For example, information may include the time and date, the area code of the vicinity in which the device is located, or access frequency values for the directory entries. Other components directory system 400 may include is output controller 450 and transitory medium 460. The transitory medium is adapted to remove one or more directory entries from data structure 432 of storage medium 430. Transitory medium 460 may alternatively include a delete set (not shown) in which to store expired directories. Storage medium 430 and transitory medium 460 interact with the processor to offer results to output controller 450. The output controller formats the information in manner that may be given to the user to output/display device 470. The display device may comprise of vocal instructions or visual displays on the screen of the device.

Figure 12:
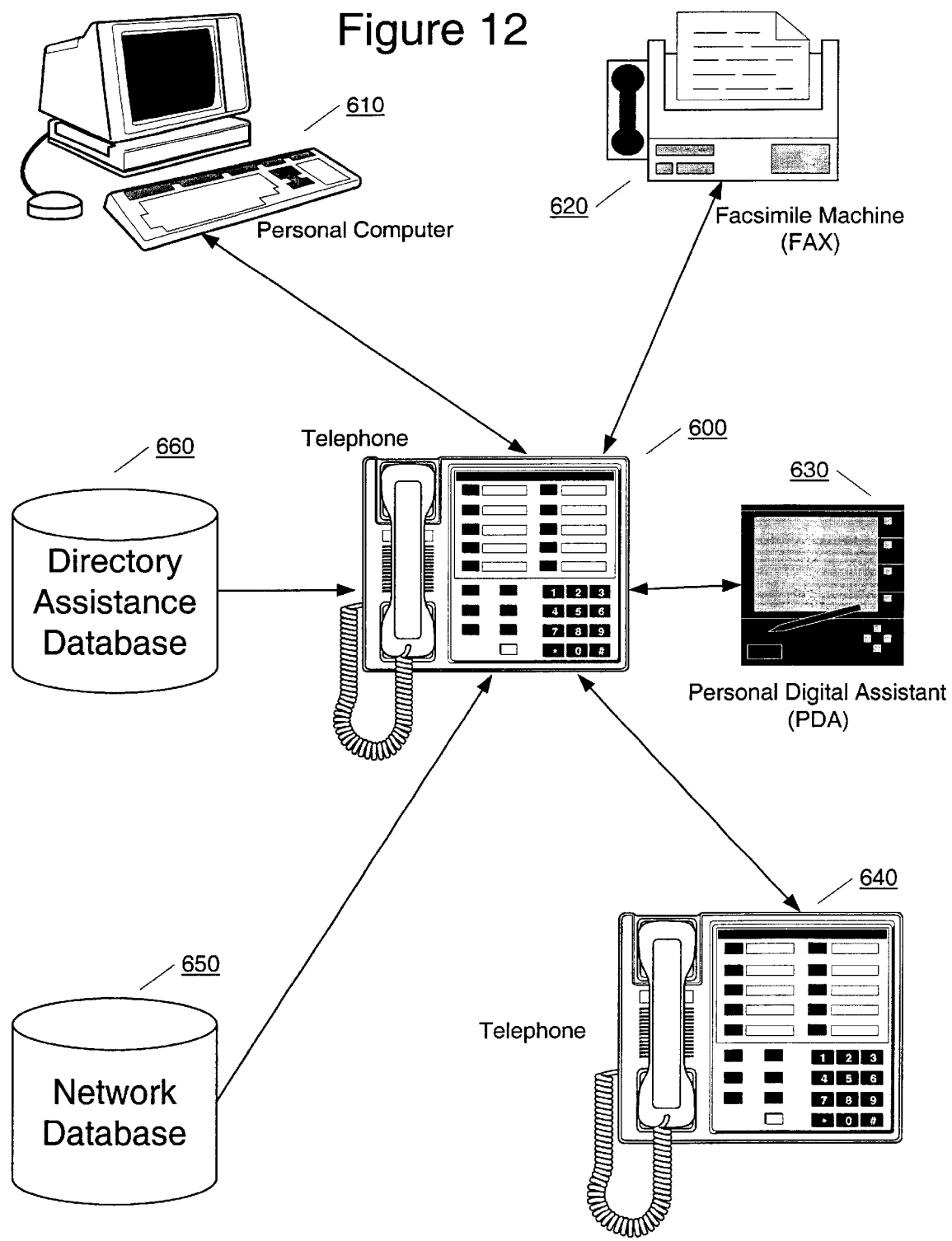
FIG. 12 illustrates the communication paths between electronic communication devices for the system recited herein.

FIG. 12 outlines the communication interfaces of the devices discussed herein. The items of telephone 600, personal computer 610, facsimile machine 620, personal digital assistant 630 and telephone 640 contain a directory system similar to that of one contained in FIG. 11. As shown in FIG. 12, all of the aforementioned items may have dual interface communication in which directory entries and other information may be transferred to and from the device. The databases of directory assistance database 660 and network database 650 can send information to a device equipped with the directory system recited herein, but cannot receive the information as the other devices can.

Preferably the user of a device is allowed to download information from a database, thus ensuring that no one has access to the directory with exception of the user. It is understood that telephone 600 of FIG. 12 may be substituted with other electronic communications devices such as a facsimile machine or personal digital assistant. These alternative embodiments (not shown) allow communication between multiple facsimile machines and personal digital assistants containing directory systems recited herein.

FIG. 13 shows the interface communication between directory system 400 and directory system 500. Directory system 400 contains all of the same components as that of FIG. 11 and directory system 500 comprises similar components as indicated by processor 520, storage medium 530, transitory medium 550 and output controller 560. Storage medium 530 contains data structure 532 and directory management program 536 and tracking medium 540. Data structure 532 comprises fields 534 which are adapted for the storage of entry content values including identifiers of the set and subset associated with each directory entry. Directory management program 536 comprises program instructions 538 which are executable by processor 520. Each of these components interact to display information on output/display device 570. Output controller 24 of directory system 400 may be interfaced to input 510 of directory system 500 in order to transfer directory entries, subsets or sets from directory system 400 to directory system 500. In an alternative embodiment (not shown), output controller 560 of directory system 500 may be interfaced to input 410 of directory system 400 in order to reverse the transfer of entries.

It will be appreciated by those skilled in the art having the benefit of this disclosure that this invention is believed to provide a system and method for directory management systems within electronic devices. Furthermore, it is also to be understood that the form of the invention shown and described is to be taken as exemplary, presently preferred embodiments. Various modifications and changes may be made without departing from the spirit and scope of the invention as set forth in the claims. In particular, the system and methods described herein may be implemented using many combinations of hardware and/or software, and at one or more of many different levels of hardware and/or software, as is the case with many processor-based applications. It is intended that the following claims be interpreted to embrace all such modifications and changes.

What is claimed is:

1. An electronic communications device adapted to electronically receive a directory listing from a directory assistance service into a directory of the electronic communications device, wherein the electronic communications device comprises:

a processor; and
a storage medium comprising a data structure adapted to organize directory entries and a directory management program, wherein the directory management program comprises program instructions executable by the processor for:
comparing entry content values associated with the directory entries with listing contents of the directory listing; and
replacing at least one of the entry content values of one of the directory entries with the corresponding listing contents of the directory listing upon matching one or more of the entry content values of said one of the directory entries with one or more of the listing contents of the directory listing, wherein said at least one of the entry content values of said one of the directory entries does not match the corresponding listing contents of the directory listing.

2. The electronic communications device as recited in claim 1, wherein the electronic communications device comprises a telephone.

3. The electronic communications device as recited in claim 1, wherein the electronic communications device comprises a facsimile.

4. The electronic communications device as recited in claim 1, wherein the electronic communications device comprises a personal digital assistant.

5. The electronic communications device as recited in claim 1, wherein said directory listing comprises categories adapted to store said listing contents, and wherein said listing contents comprise a name, a transfer designation number or a mailing address.

6. The electronic communications device as recited in claim 1, wherein the entry content values comprise a name, a transfer designation number, a mailing address, an e-mail address, or user-defined information.

7. The electronic communications device as recited in claim 1, wherein the data structure is further adapted to organize the directory entries using at least one set and at least one subset, wherein the at least one subset comprises at least one entry and the at least one set comprises the at least one subset, wherein said data structure comprises fields adapted for storage of the entry content values associated with the directory entries, and wherein said fields correspond to categories of said directory listing.

8. The electronic communications device as recited in claim 1, wherein the directory management program further comprises program instructions executable by the processor for receiving said listing contents of the directory listing in an electronic format.

9. The electronic communications device as recited in claim 8, wherein the directory management program further comprises program instructions executable by the processor for presenting a permission prompt to a user of the electronic communications device.

10. The electronic communications device as recited in claim 9, wherein said presenting comprises displaying on an output mechanism of the electronic communications device.

11. The electronic communications device as recited in claim 9, wherein said presenting comprises providing audible output.

12. The electronic communications device as recited in claim 9, wherein the directory management program further comprises program instructions executable by the processor for receiving a confirmation command to accept delivery of the directory listing.

13. The electronic communications device as recited in claim 12, wherein said receiving comprises receiving a vocal command.

14. The electronic communications device as recited in claim 12, wherein said receiving comprises receiving a dual tone multi-frequency (DTMF) tone.

15. The electronic communications device as recited in claim 12, wherein the directory management program further comprises program instructions executable by the processor for receiving an assigned location within at least one set or subset of the directory in which to receive the directory listing.

16. The electronic communications device as recited in claim 15, wherein the directory management program further comprises program instructions executable by the processor for placing the directory listing in the assigned location of the at least one set or subset, and wherein the listing contents are placed in corresponding fields of the data structure.

17. The electronic communications device as recited in claim 9, wherein the directory management program further comprises program instructions executable by the processor for receiving a reject command to reject delivery of the directory listing.

18. The electronic communications device as recited in claim 1, wherein the directory management program further comprises program instructions executable by the processor for creating a new directory entry containing the listing contents of the directory listing upon not matching one or more of the entry content values with one or more of the listing contents.

19. A method of transferring a directory listing from a directory assistance service to a directory of an electronic communications device, said method comprising:

receiving the directory listing;

activating a transfer command upon matching one or more of entry content values of an entry within the directory with one or more corresponding listing contents of the directory listing; wherein said one or more of the entry content values of said entry of the directory does not match the corresponding listing content of the directory listing;

prompting a user of the device to select a destination subset or set within a directory of the device in which to transfer the directory listing; and transferring the directory listing to the destination subset or set of the directory of the electronic communications device.

20. A method for allowing transfer of a directory listing from a directory assistance service to a directory of an electronic communications device, said method comprising:

receiving listing contents of the directory listing from the directory assistance service into the directory of the electronic communications device;

searching the directory for directory entries having at least one entry content value that matches the listing contents of the directory listing;

presenting the directory listing and one or more of the directory entries having at least one entry content value that matches the listing contents of the directory listing to a user of the electronic communications device;

prompting the user for confirmation that the one or more directory entries are the same as the directory listing; and if the user confirms that the one or more directory entries are the same as the directory listing, updating entry content values of the one or more directory entries that do not match the listing contents of the directory listing.

21. A storage medium, comprising:

data structure adapted to organize directory entries in a directory of an electronic communications device;

first program instructions executable using a processor within the electronic communications device for receiving listing contents of a directory listing in an electronic format;

second program instructions executable using the processor for comparing entry content values associated with the directory entries with the listing contents of the directory listing; and third program instructions executable using the processor for replacing at least one of the entry content values of one of the directory entries with corresponding listing contents of the directory listing upon matching one or more of the entry content values of said one of the directory entries with one or more of the listing contents of the directory listing, wherein said at least one of the entry content values of the one of the directory entries does not match the corresponding listing content of the directory listing.

22. The storage medium recited in claim 21, further comprising fourth program instructions executable using the processor within the electronic communications device for placing the directory listing in the directory of the electronic communications device.

23. The storage medium recited in claim 21, further comprising fourth program instructions executable using the processor within the electronic communications device for creating a new directory entry containing the contents of the directory listing upon not matching one or more of the entry content values with the one or more of the listing contents.

* * * * *

UNITED STATES PATENT AND TRADEMARK OFFICE
CERTIFICATE OF CORRECTION

PATENT NO. : 6,603,839 B1  
DATED : August 5, 2003  
INVENTOR(S) : Smith, Jr. et al.

It is certified that error appears in the above-identified patent and that said Letters Patent is hereby corrected as shown below:

<u>Column 20,</u>  
Line 55, before the phrase "data structure," please insert the word -- a --.

Signed and Sealed this

Twentieth Day of April, 2004

JON W. DUDAS  
*Acting Director of the United States Patent and Trademark Office*